(12) United States Patent
Jin

(10) Patent No.: US 6,318,507 B1
(45) Date of Patent: Nov. 20, 2001

(54) EMERGENCY STOP APPARATUS FOR ELEVATOR

(75) Inventor: Hyun Ho Jin, Seoul (KR)

(73) Assignee: LG Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 09/457,364

(22) Filed: Dec. 9, 1999

(30) Foreign Application Priority Data

Dec. 12, 1998 (KR) .................................................. 98-54651

(51) Int. Cl.⁷ ................................. B66B 5/04; B60T 8/32
(52) U.S. Cl. ........................ 187/376; 187/373; 187/351; 188/188; 188/189
(58) Field of Search ........................... 187/350, 373–376, 187/351, 305, 286, 287; 188/188, 189

(56) References Cited

U.S. PATENT DOCUMENTS

| | | | | |
|---|---|---|---|---|
| 789,002 | * | 5/1905 | Carpenter | 187/375 |
| 1,182,240 | * | 5/1916 | Bemies | 187/375 |
| 4,029,177 | * | 6/1977 | Fiss | 187/374 |
| 4,089,391 | * | 5/1978 | Schill | 187/373 |
| 4,662,481 | * | 5/1987 | Morris et al. | 187/373 |
| 5,052,523 | * | 10/1991 | Ericson | 187/350 |
| 5,065,845 | | 11/1991 | Pearson . | |
| 5,299,661 | | 4/1994 | Pramanik et al. . | |
| 5,377,786 | * | 1/1995 | Nakagawa | 187/373 X |

* cited by examiner

Primary Examiner—Eileen D. Lillis
Assistant Examiner—Thuy V. Tran
(74) Attorney, Agent, or Firm—Birch, Stewart, Kolasch & Birch, LLP

(57) ABSTRACT

An emergency stop apparatus for an elevator having a simple structure as well as effectiveness, which may facilitate to reduce manufacturing and maintaining cost. The emergency stop apparatus for an elevator includes a pair of wedges for stopping the elevator by constricting the guide rail when the elevator moves in excess speed; a flexible cable for drawing the wedges upward when the elevator moves in excess speed; a cam having a rotary shaft engaged with the flexible cable for drawing the cable upward when the elevator moves in excess speed; a disk roller which rides and rolls on the guide rail on the center of a rotary shaft thereof when the elevator moves and receiving pressure from the cam means toward the guide rail when the elevator moves in excess speed; a centrifugal weight having same rotary shaft as the disk roller for rotating the cam means when the elevator moves in excess speed; and a spring for biasing the centrifugal weight to come in contact with the cam means when the elevator moves in excess speed.

3 Claims, 6 Drawing Sheets

EMERGENCY STOP APPARATUS FOR ELEVATOR

BACKGROUND OF THE INVENTION

1. Technical Field

The present invention relates to an emergency stop apparatus for an elevator, and more particularly to an emergency stop apparatus for an elevator having a simple structure as well as effectiveness, which may facilitate to reduce manufacturing and maintaining cost.

2. Description of the Prior Art

The elevator is generally designed to ascend and descend at a regular speed in an at least two-story building. However, the elevator car often descends much faster than a normal speed for reasons of malfunction of controller or other units, especially in downward motion. In order to prevent accidents by such factors, the elevator ordinarily includes an emergency stop apparatus.

U.S. Pat. No. 5,299,661 issued on Apr. 5, 1994 discloses an elevator system having a bidirectional overspeed control device and a governor rope circularly connected to sheaves mounted to upper and lower portions of a hoist way. According to the patent, the bidirectional overspeed control device includes a bidirectional governor, safety brakes and a bidirectional linkage apparatus, in which the bidirectional governor clutches the governor rope in the event of an overspeed condition, thereby operating the bidirectional linkage apparatus which connects the governor rope to the safety.

FIG. 1 shows the emergency stop apparatus employed in such elevator system schematically. Referring to the figure, the emergency stop apparatus of the conventional elevator system is installed to an elevator car 2 moving vertically along a guide rail 1 in a hoist way inside a building. The emergency stop apparatus includes a speed governing unit 10 installed to one side of the guide rail 1 for detecting speed of the elevator car 2 in order to brake the elevator car 2 when the car 2 moves faster than a certain speed, a transmission unit 20 connected to the governor 2 for transmitting power from the speed governing unit 10, and a brake 30 installed under the elevator car 2 for restraining the elevator car 2 by receiving power from the speed governing unit 10 through the transmission unit 20.

The speed governor 10 includes a governor 11, a driven pulley 12, and a governing loop 13. The governor 11 includes a rotating body 11A for rotating at the same speed as speed of the elevator car 2 and stopping when the elevator car 2 moves faster than a regular speed, and a centrifugal weight 11B having same rotary axis as the rotating body 11B. The driven pulley 12 is mounted at a lower end of the guide rail 1 and the governing loop 13 is wound through the rotating body 11A and the driven pulley 12.

The transmission unit 20 includes a connecting member 21 and a multi-joint link member 22. The connecting member 21 is combined to the governing loop 13 in order to lift at the same speed as the governing loop 13. The multi-joint link member 22 is combined to the connecting member 21 and activates a pair of wedges 31 of the brake 30 described below when the governing loop 13 comes to a halt.

The brake 30 is well shown in FIGS. 2 and 3. Referring to the figures, the brake 30 includes the wedges 31, an elastic ring 32, a wedge seat 33 and sliding rollers 34. When stopping the elevator car 2 in emergency, the wedges 31 are drawn by the link member 22 of the transmission unit 20 and then come in contact with the guide rail 1. As described above, the wedges 31 in contact with the guide rail 1 make frictional force to the guide rail 1, and at this time, the elastic ring 32 exerts vertical force to the wedges 31 in order to increase the frictional force between the wedges 31 and the guide rail 1. The wedge seat 33 is mounted between outer sides of the wedges 31 and an inner side of the elastic ring 32. The wedge seat 33 has is formed to become gradually narrower in its upward direction such that the wedges 31 may be pressed by more vertical force from the elastic ring 32 as the wedges 31 ascend. The sliding rollers 34 are located between the outer surface of the wedge seat 33 and the inner surface of the wedges 31 and play a role of eliminating friction between the wedges 31 and the wedge seat 33 such that the wedges 31 may ascend inside the wedge seat 33 more smoothly.

The emergency stop apparatus of the conventional elevator system as constructed above is operated as follows.

If the elevator car 2 moves in excess speed due to a breakdown or a falling in the hoist way, the governor 11 is activated by the rotating body 11A and the centrifugal weight 11B rotating at the same speed as speed of the elevator. The governor 11 acts for stopping the governing loop 13 moving along with the elevator car 2. If the governing loop 13 stops, the link member 22 of the transmission unit 20 is linked to draw the wedges 31 of the brake 30.

If the wedges 31 are drawn by the link member 22 as described above, the wedges 31 move upward inside the wedge seat 33 formed to become gradually narrower in its upward direction, and then receives strong press inward through the wedge seat 33 from the elastic ring 32. Therefore, an inner surface of each wedge 31 comes in contact with an outer surface of the guide rail 1, resulting that the elevator car 2 stops by frictional force generated in the contact surface.

However, such emergency stop apparatus of the conventional elevator system has a problem of low spatial utility rate because it needs separate space for installing the speed governing unit 10 having the governor 11, the driven pulley 12 and the governing loop 13 outside the guide rail 1. Furthermore, because a separate link member 22 should be linked for transferring action of the governor 11 to the wedges 31, it has high manufacturing cost, and it is difficult to fabricate, install and repair the link member 22.

SUMMARY OF THE INVENTION

Therefore, the present invention is designed to overcome such problems of the prior emergency stop apparatus. An object of the present invention is to provide an improved emergency stop apparatus of an elevator, which may increase spatial utility rate, lowers manufacturing cost, and allows fabricating, installing and repairing the apparatus easily.

In order to obtain such object, the present invention provides an emergency stop apparatus for an elevator which is vertically movable along a guide rail installed vertically to a wall of hoist way in a building, comprising: a pair of wedge means for stopping the elevator by constricting the guide rail when the elevator moves in excess speed; a flexible cable, one end of which is combined with one of the wedge means, the other end of which is combined with the other one of the wedge means, the flexible cable drawing the wedge means upward when the elevator moves in excess speed; cam means having a rotary shaft engaged with the flexible cable, the cam means drawing the cable upward when the elevator moves in excess speed; a disk roller which rides and rolls on the guide rail on the center of a rotary shaft thereof when the elevator moves, the disk roller receiving pressure from the cam means toward the guide rail when the elevator moves in excess speed; a centrifugal weight having same rotary shaft as the disk roller, the centrifugal weight rotating the cam means when the elevator moves in excess speed; and a spring, one end of which is fixed to the rotary shaft of the disk roller, the other end of which is fixed to the centrifugal weight, the spring biasing the centrifugal weight to come in contact with the cam means when the elevator moves in excess speed.

The emergency stop apparatus for an elevator may further include first spring for biasing the disk roller toward the guide rail; second spring for maintaining height of the disk roller, the second spring allowing the rotary shaft of the disk roller to move upward by contact between the cam means and the disk roller; and third spring for maintaining position of the cam means, the third spring allowing the rotary shaft of the cam means to move upward by contact between the cam means and the disk roller.

The emergency stop apparatus for an elevator may also further include a limit block having an inclined portion for limiting rise of the rotary shaft of the cam means.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE PREFERRED EMBODIMENT

Hereinafter, preferred embodiments of the present invention will be described in detail with reference to the accompanying drawings.

Figure 1:
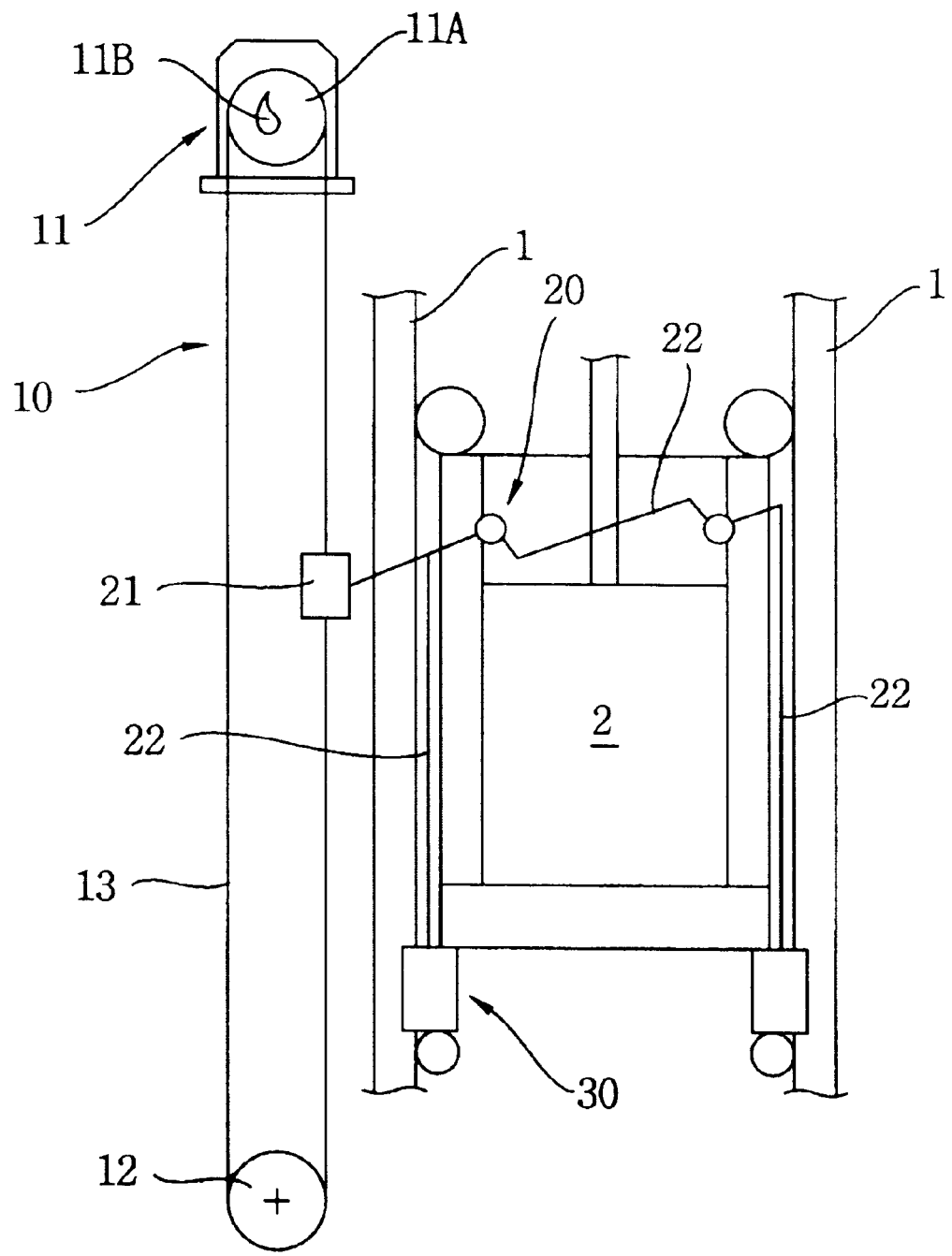
FIG. 1 is a schematic diagram for showing an emergency stop apparatus for an elevator according to the prior art.
Figure 2:
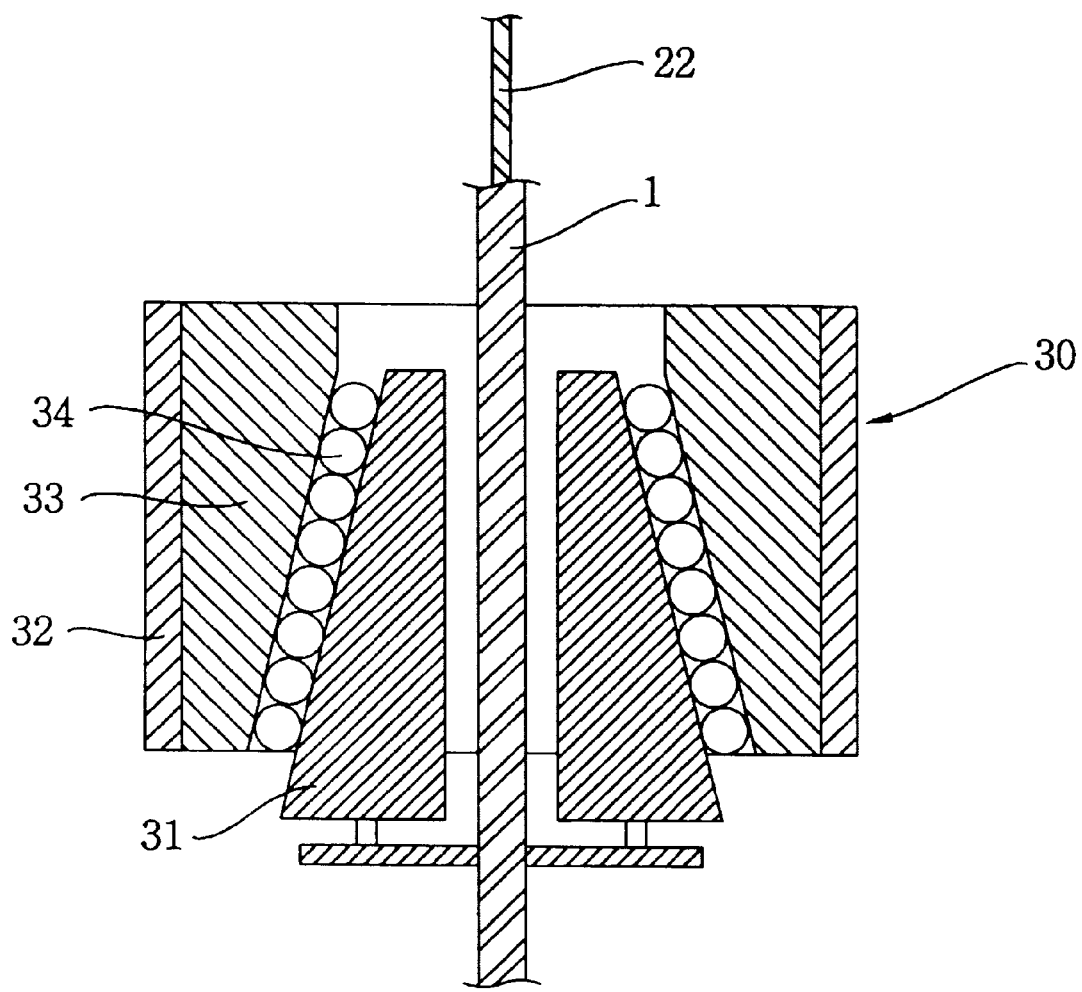
FIG. 2 is a section view for showing a brake of the emergency stop apparatus for an elevator according to the prior art.
Figure 3:
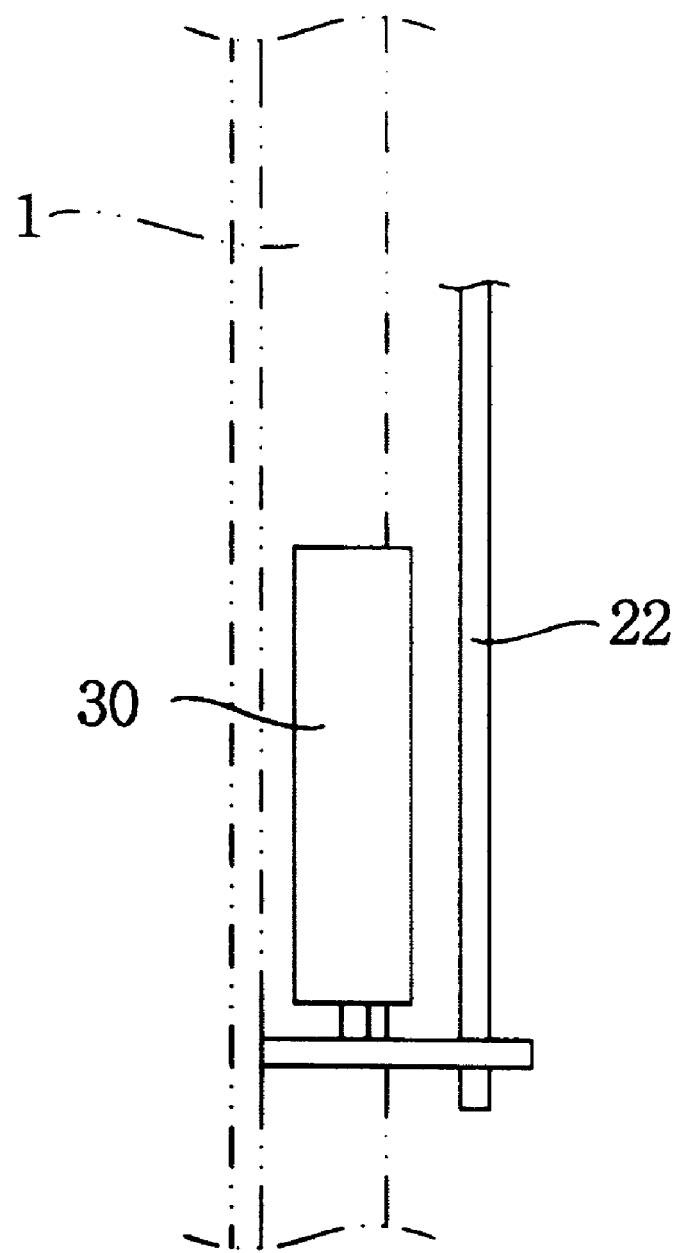
FIG. 3 is a side view for showing the brake of FIG. 2.
Figure 4:
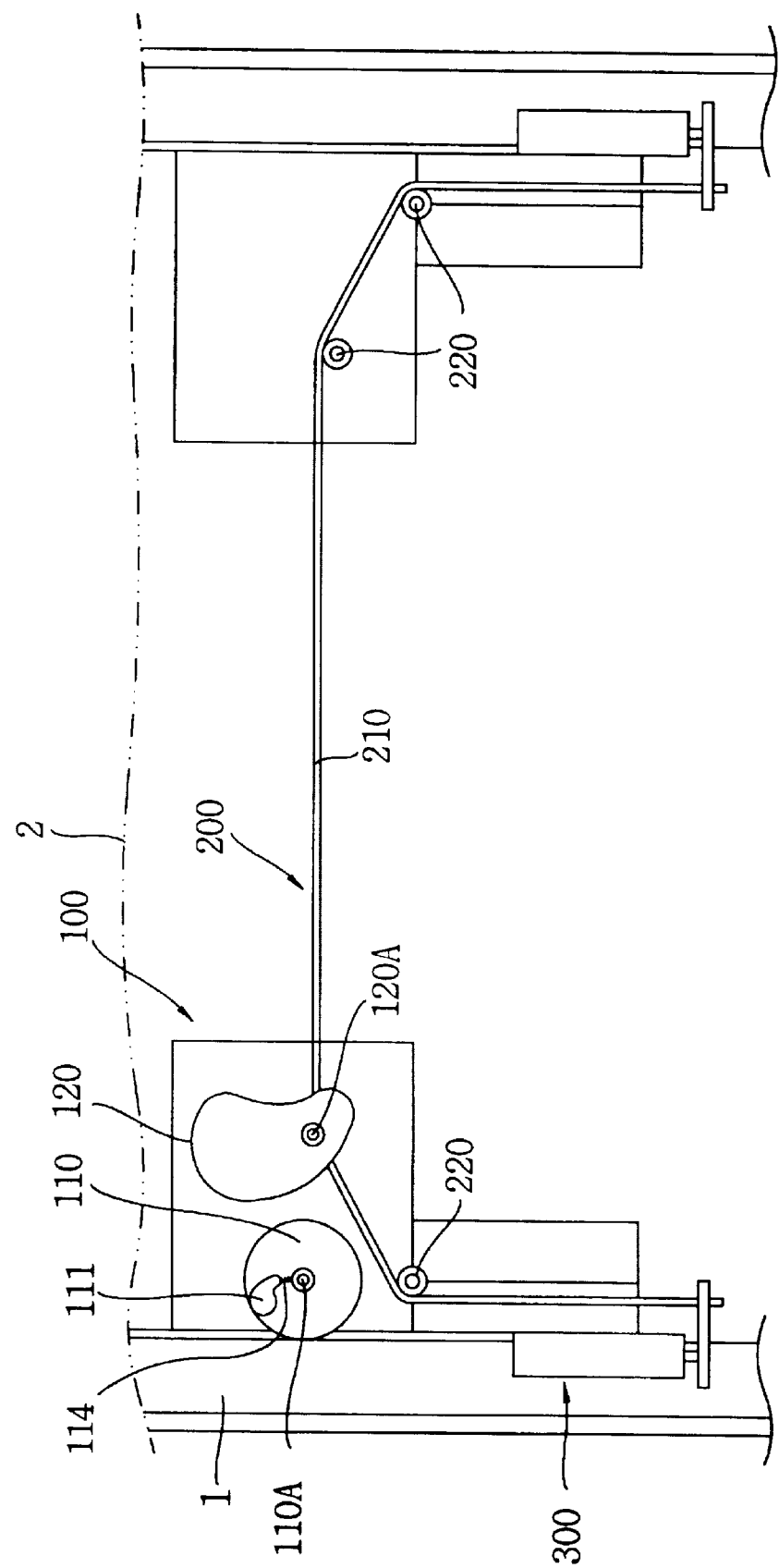
FIG. 4 schematically shows an emergency stop apparatus for an elevator according to the present invention.
Figure 5:
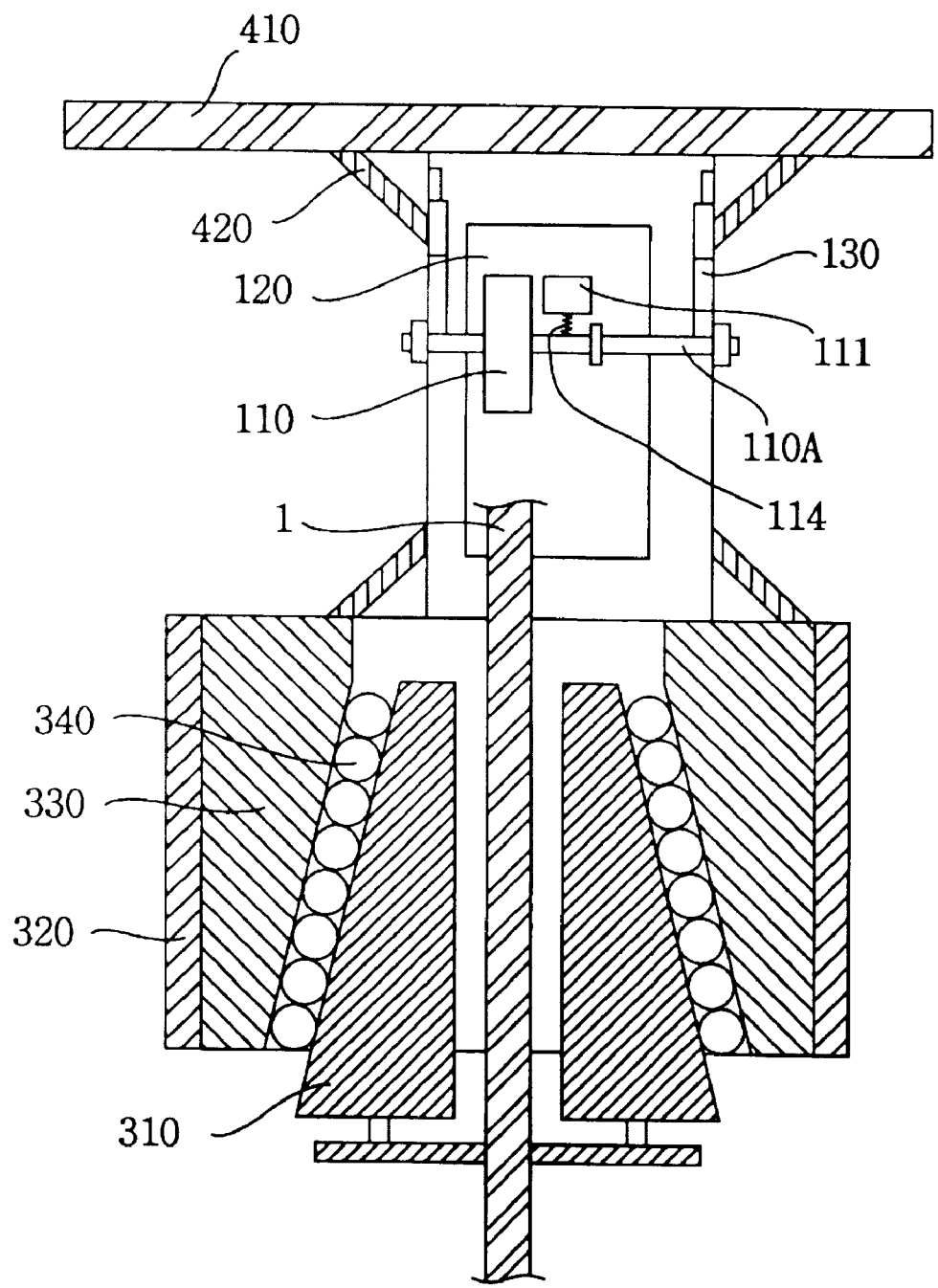
FIG. 5 is a section view for showing essential parts of the emergency stop apparatus for an elevator according to the present invention.
Figure 6:
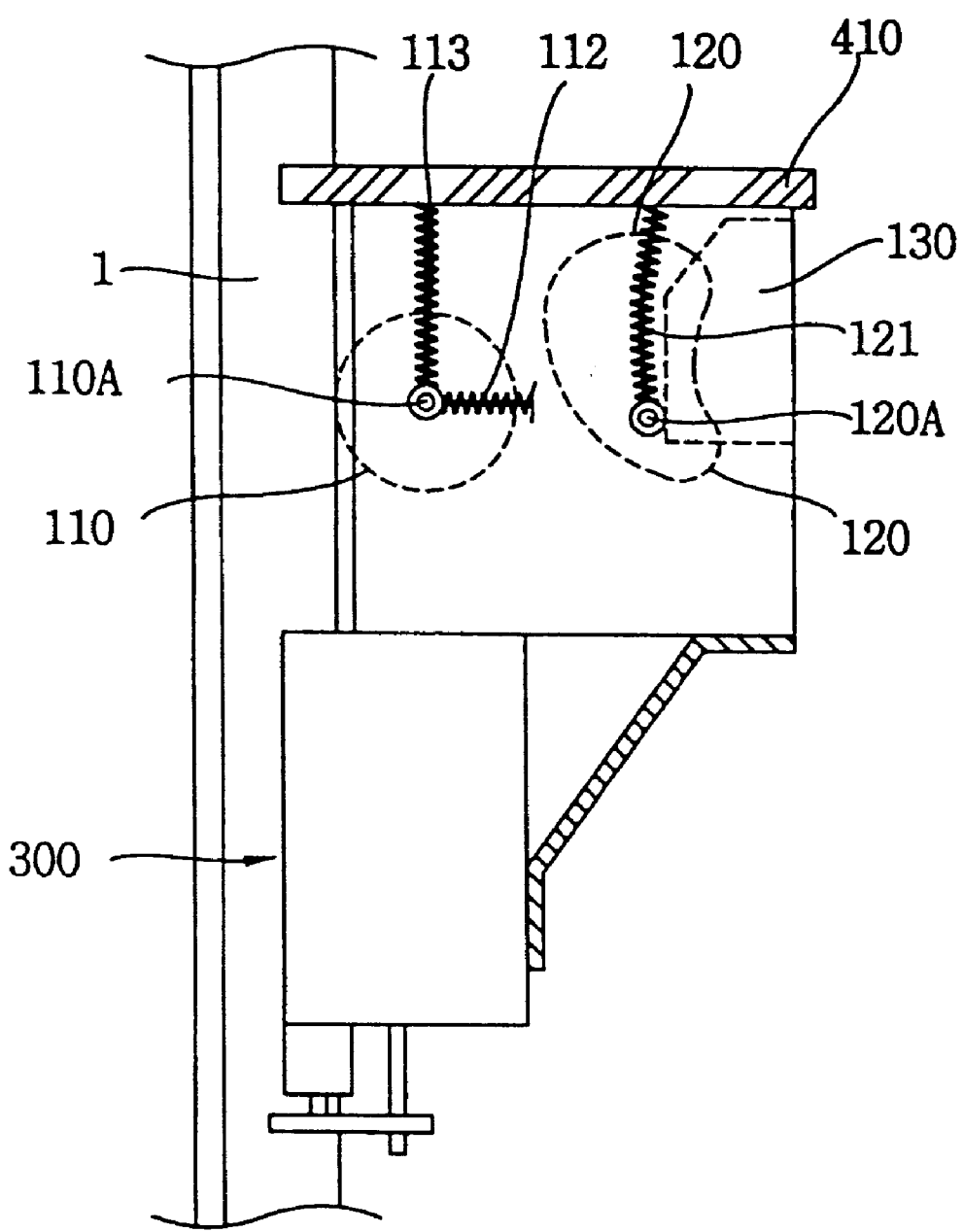
FIG. 6 is a side view showing the essential parts of FIG. 5.

FIG. 4 shows an emergency stop apparatus of an elevator according to the present invention schematically and FIG. 5 and FIG. 6 are section and side views showing essential parts of the emergency stop apparatus, respectively. The emergency stop apparatus for an elevator according to the present invention is installed to a lower end side of an elevator car 2 which moves vertically along a guide rail 1 mounted to a hoist way in a building. Referring to the figures, it can be shown that the emergency stop apparatus including a speed governing unit 100 for braking the elevator car 2 when the elevator car 2 is detected to move faster than a predetermined speed, a transmission unit 200 for transmitting power from the speed governing unit 100, and a brake 300 linked with the transmission unit 200 for restraining the elevator car 2 is installed in the hoist way between both guide rails 1.

The speed governing unit 100 includes a disk roller 110, a centrifugal weight 111 and a cam 120. The disk roller 110 is installed to the elevator car 2 and rotates in contact with an inner surface of the guide rail 1 toward the hoist way. One end of the centrifugal weight 111 is fixed to a rotary shaft of the centrifugal weight 111 while the other end is coaxially connected to the disk roller 110 through a spring 114 coupled to the centrifugal weight 111. Radius of gyration of the centrifugal weight 111 changes in accordance with rotating speed of the disk roller 110. The cam 120 rotates with pressure of the centrifugal weight 111 protruded by centrifugal force when the elevator car 2 moves in exceed speed. At this time, the cam 120 contacts and fixes the disk roller 110 to the guide rail 1. Particularly, when the cam 120 is rotated by the protruding and rotating centrifugal weight 111 so to contact and fix the disk roller 110 to the guide rail 1, the cam 120 is configured to move upward together with the disk roller 110.

At this time, it is preferred that the centrifugal weight 111 is connected to a rotary shaft 110A of the disk roller 110 through a resilient spring 114 such that the centrifugal weight 111 may extrude outside the disk roller 110 when the disk roller 110 rotates faster due to excess downward movement of the elevator car 2, while, on the other hand, the centrifugal weight 111 may restore its original position when rotating speed of the disk roller 111 is decreased.

A separation preventing spring 112 may be installed to the disk roller 110. One end of the separation preventing spring 112 is coupled to the rotary shaft 110A of the disk roller 110 while the other end is fixed to a spring seat (not shown in drawing) on a side wall of the speed governing unit 100. The separation preventing spring 112 presses the disk roller 110 toward the guide rail 1 such that the disk roller 110 would not become apart from the guide rail 1 when the elevator car 2 moves in a normal speed. Therefore, in normal operation of the elevator car 2, the disk roller 110 rotates in continuous contact with the guide rail 1.

In addition, a rotary shaft holding spring 113 is preferably mounted to the disk roller 110. One end of the rotary shaft holding spring 113 is coupled to the rotary shaft 110A of the disk roller 110, while the other end is fixed to a spring seat (not shown) on a connecting plate 410. The rotary shaft holding spring 113 is configured to play a role for maintaining height of the rotary shaft 110A of the disk roller 110, while, on the other hand, the shaft holding spring 113 may allow the rotary shaft 100A of the disk roller 110 to move upward in the event of urgent stopping of the elevator car 2.

Another rotary shaft holding spring 121 similar to, or same as, the rotary shaft holding spring 113 is also mounted to the cam 120. One end of the rotary shaft holding spring 121 for the cam 120 is coupled to a rotary shaft 120A of the cam 120, while the other end is fixed to a spring seat (not shown) on the connecting plate 410. The rotary shaft holding spring 121 for the cam 120 maintains vertical position of the rotary shaft 120A of the cam. 120, but may also allow the rotary shaft 120A of the cam 120 to move upward in the event of urgently stopping the elevator car 2.

In addition, a limit block 130 may be included at a position in contact with the rotary shaft 120A in order to limit upward movement of the rotary shaft 120A in the event of the emergent stopping. The limit block 130 has a plane portion and an upper inclined portion in a surface contacting with the rotary shaft 120A. Preferably, the limit block 130 makes it possible that the rotary shaft 120A moves toward middle of the hoist way when ascending to the inclined portion such that the space between the rotary shafts 110A, 120A may become wide.

The transmission unit 200 includes a flexible cable 210 and a plurality of pulleys 220. The flexible cable 210 is tightly supported and guided by a plurality of the pulleys 220. The flexible cable 210 is connected to the brake 300 at its both ends and conjunct with the rotary shaft 120A of the cam 120 at a certain intermediate position thereof. The flexible cable 210 as constructed above is drawn upward when the rotary shaft 120A of the cam 120 ascends during emergent stopping of the elevator car 2, which exerts upward tension to the brake 300.

The brake includes a pair of wedges 310, an elastic ring 320, a wedge seat 330 and slide rollers 340. The wedges 310 are drawn by the flexible cable 210, which is drawn upward together with the rotary shaft 120A of the cam 120 when the elevator car 2 stops in an emergent case. The wedge seat 330 formed to become gradually narrower in its upward direction between an outer side of the wedges 310 and an inner side of the elastic ring 320. Therefore, while moving upward between a pair of the wedge seat 330, the wedges 310 generate frictional force in contact with the guide rail 1, which is positioned inside the wedges 310. The elastic ring 320 is formed to press an outer surface of the wedge seat 330 inward. The elastic ring 320 increase the frictional force between the guide rail 1 and the wedges 310 by exerting elastic force centripetally such that the wedge seat 330 does not widen while the wedges 310 move upward inside the wedge seat 330. The slide rollers 340 are positioned between an inner side of the wedge seat 330 and outer sides of the wedges 310. The slide rollers 340 prevent friction generation between the wedges 310 and the wedge seat 330 when the wedges 310 move upward inside the wedge seat 330 such that the wedges 310 may easily move upward inside the wedge seat 330.

Referring to FIG. 5, it will be understood that in the emergency stop apparatus of the present invention, the speed governing unit 100 may be formed upon or integrated with the brake 300. The emergency stop apparatus may be also combined to a lower frame of the elevator car 2 with use of, such as, the connecting plate 410, and such combination can be reinforced with use of supporting members 420.

The emergency stop apparatus according to the present invention as constructed above operates as follows.

If the elevator car 2 reaches at excess speed due to, for example, a breakdown or a falling in the hoist way, the disk roller 110, rotating in contact with the guide rail 1, becomes rotated at the same excess speed as speed of the elevator car 2. If the disk roller 110 rotates in the excess speed, the centrifugal weight 111, connected to same rotary shaft as the disk roller 110, also rotates in the excess speed. The centrifugal weight 111 rotating in the excess speed then protrudes outside the disk roller 110 due to its centrifugal force, which makes radius of gyration thereof increased. This makes the centrifugal weight 111 contacted with the cam 120, and the cam 120 rotate to an opposite direction to the disk roller 110.

With rotating, the cam 120 pushes the disk roller 110 toward the guide rail 1. The disk roller 110 pushed by the cam 120 is then pressed to the guide rail 1 and then stops its rotation. While the disk roller 110 is pressed to the guide rail 1 and then stops its rotation by the cam 120, the elevator still moves downward, by which the disk roller 110 and the cam 120 thus move upward. At this time, the disk roller 110 and the cam 120 move upward with pressing the rotary shaft holding springs 113, 121. If the cam 120 moves upward, the flexible cable connected to the rotary shaft 120A of the cam 120 is drawn. If the flexible cable 210 is drawn, the wedges 310 connected to both end of the flexible cable 210 are also drawn. Therefore, a pair of the wedges 310 moves upward with use of the slide rollers 340 inside the wedge seat 330 formed to become gradually narrower in its upward direction, which makes the wedges 310 pressed inward. The wedges 310 pressed inward then come in contact with the guide rail 1 therebetween and generate friction.

At this time, the rotary shafts 110A, 120A of the disk roller 110 and the cam 120 move upward with maintaining a certain space therebetween. If the rotary shaft 120A reaches the inclined upper portion of the limit block 130, the space between the rotary shafts 110A, 120A becomes wide so that the disk roller 110 and the cam 120 become apart from each other. After that, the disk roller 110 separated from the cam 120 begins rotation again along the guide rail 1.

The flexible cable 210 is drawn until the cam 120 reaches the inclined portion of the limit block 130. After the cam 120 reaches the inclined portion, external force to draw the wedges 310 upward is vanished. However, though upward force is disappeared, the wedges 310 move upward more because of friction with the guide rail 1. Therefore, the wedges 310 become pressed by the wedge seat 330 more and more, which results in more powerful friction with the wedges 310 while tightening the guide rail 1 stronger. Therefore, the elevator car 2 is then eventually stopped.

As described above, the emergency stop apparatus for an elevator according to the present invention may increase spatial utility rate in the fact that all of the speed governing unit, the transmission unit and the brake required for stopping the elevator car in emergency are installed in the hoist way between the guide rails.

In particular, employing the flexible cable to the transmission unit instead of the link members helps to lower manufacturing cost, and makes it easy to install and maintain the apparatus.

The emergency stop apparatus for an elevator according to the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An emergency stop apparatus for an elevator which is vertically movable along a guide rail installed vertically to a wall of hoist way in a building, comprising:

a pair of wedge means for stopping the elevator by constricting the guide rail when the elevator moves in excess speed;

a flexible cable, one end of which is combined with one of the wedge means, the other end of which is combined with the other one of the wedge means, the flexible cable drawing the wedge means upward when the elevator moves in excess speed;

cam means having a rotary shaft engaged with the flexible cable, the cam means drawing the cable upward when the elevator moves in excess speed;

a disk roller which rides and rolls on the guide rail on the center of a rotary shaft thereof when the elevator moves, the disk roller receiving pressure from the cam means toward the guide rail when the elevator moves in excess speed;

a centrifugal weight rotating the cam means when the elevator moves in excess speed; and a spring, one end of which is fixed to the rotary shaft of the disk roller, the other end of which is fixed to the centrifugal weight, the spring biasing the centrifugal weight to come in contact with the cam means when the elevator moves in excess speed.

2. The emergency stop apparatus for an elevator as claimed in claim 1, further comprising:

first spring for biasing the disk roller toward the guide rail;

second spring for maintaining vertical position of the disk roller, the second spring allowing the rotary shaft of the disk roller to move upward by contact between the cam means and the disk roller; and third spring for maintaining position of the cam means, the third spring allowing the rotary shaft of the cam means to move upward by contact between the cam means and the disk roller.

3. The emergency stop apparatus for an elevator as claimed in claim 1, further comprising a limit block having an inclined portion for limiting rise of the rotary shaft of the cam means.

* * * * *